Patented Nov. 18, 1941

2,262,997

UNITED STATES PATENT OFFICE 2,262,997

PRECIPITATION OF POLYVINYL ACETAL RESINS

Charles R. Fordyce, Rochester, N. Y., assignor to Eastman Kodak Company, Rochester, N. Y., a corporation of New Jersey No Drawing. Application August 9, 1938, Serial No. 223,903

1 Claim. (Cl. 260—73)

This invention relates to the recovery of polyvinyl acetal resins from their reaction mixtures in which the presence of a large amount of a water-miscible solvent for the resin is present.

The stability and color of polyvinyl acetal resins are to a great extend dependent on the degree to which these resins have been separated from contaminating agents, such as the catalyst, excess aldehyde present or the side reaction products that might have been formed in its preparation. In previous processes of preparing polyvinyl acetal resins, the products were usually isolated and purified by pouring the viscous undiluted reaction mixture into water in which the heavy mass of resin was mixed for several hours to remove the excess reaction ingredients. Usually the resin is digested in hot water to assure removal of the contaminating agents. The resin, after this purification treatment, was ordinarily a rubber-like, discolored mass which was difficult to dry and process. Also, there always existed the possibility of altering the chemical composition of the resin by acid hydrolysis.

One object of my invention is to provide a process of precipitating polyvinyl acetal resins from their reaction mixtures in a soft, easily-washable form. Another object of my invention is to provide a process of precipitating polyvinyl acetal resins without any danger of altering the chemical composition of the resin by acid hydrolysis. Other objects will appear herein.

I have found that when a polyvinyl acetal resin, containing less than 20% polyvinyl acetate and not over 25% of polyvinyl alcohol (when an aliphatic aldehyde has been used) is precipitated into water in the presence of a large proportion of a water-miscible solvent, which is also a solvent for the resin, a product in the form of soft clumps, fibers, shreds or powder is obtained which can be readily disintegrated and washed and which is readily susceptible to solution by organic solvents in which it is soluble. I have found that this precipitate having highly desirable physical properties, may be obtained by diluting the reaction mixture, after the major portion of the reaction has occurred, with a water-miscible organic solvent in sufficient proportion that globules which enclose unprecipitated resin are not formed upon precipitating the diluted reaction mass into water. I have also found that a product, having the highly desirable physical properties listed may be obtained by precipitating the completed reaction mixture into an excess of water containing at least 10% by weight and not more than 20% of a water-miscible organic solvent which will not itself precipitate the resin from the reaction mixture. The proportion of solvent would depend to some extent on the resin which was being precipitated, as with resins which are more susceptible to the action of water, the presence of additional organic solvent, such as 5% more, would usually be desirable.

In view of the influence of the diluent on the physical form of the product, it might be suggested that the desired product could be obtained using a large proportion of diluent in the reaction mixture. This practice has the disadvantage that, to prevent getting a resin having a high hydroxyl content, the use of more aldehyde is necessitated in order to keep the concentration of that reagent sufficiently high in the reaction. This practice also has the disadvantage that the capacity of the equipment for producing polyvinyl acetal resins is thereby lowered in view of the large bulk of non-reactive material which is present. As pointed out above, my invention is primarily directed to the precipitation of resins containing less than 20% of polyvinyl acetate, as resins having more than that content of polyvinyl acetate exhibit a tendency towards plasticity while wet and, therefore, a resin, having the desired physical properties, is not obtained. My invention is also directed primarily to the precipitation of polyvinyl acetal resins, which are not soluble in aqueous solutions, as otherwise precipitation could not occur. The line of division, as to content of polyvinyl alcohol in the acetal resins which are satisfactorily precipitated by my process, is not over 25% polyvinyl alcohol, where only aliphatic aldehydes are employed in the reaction, and not over 35% of polyvinyl alcohol in the case of mixed acetal resins in which substantial amounts of aromatic aldehydes have been employed in their preparation.

The solvents, which may be employed for diluting or for use in the precipitating bath, are any water-miscible solvents which will not themselves precipitate the resins and which are inert to the reagents in the reaction mixture. For instance, the lower ketones or alcohols, such as acetone, methyl alcohol, ethyl alcohol or isopropyl alcohol, will be quite satisfactory in a precipitation in accordance with my process. Also, lower fatty acids, particularly acetic acid or water-soluble liquid esters, such as methyl or ethyl acetates, may be employed. It is recognized that some of the esters are not soluble to a great extent with water, however, any ester, which is sufficiently miscible with water to be employed in accordance with my invention, particularly for diluting of the reaction mixture, may be employed. It is preferred that in diluting the reaction mixture prior to precipitation the dilution be not too great, as this would cause the formation of a powder which is not as desirable to handle as the soft clumps, fibers or shreds which may be obtained with the use of a moderate but sufficient amount of diluent.

In precipitating a polyvinyl acetal resin, having a polyvinyl alcohol content below 10%, ordinary temperatures of precipitation are satisfactory. It is preferred, however, that the temperature be not allowed to exceed 50° C. as above that temperature there is a tendency for the resin to become softened which would cause agglomeration of the fibers or shreds of the resin during the precipitation. If, however, the polyvinyl acetal resin has a polyvinyl alcohol content of more than 10%, it is desirable to use water having a temperature of at least 40° C.

My invention may be carried out by diluting the reaction mixture with a water-miscible organic solvent, such as in an amount, at least, of equal volume. The diluted reaction mixture is then poured into a large excess of violently agitated water causing the resin to precipitate in finely divided form. The resulting resin may be easily washed and, upon drying, retains the physical nature it had upon precipitation. Also, there is no discoloration present, such as characterizes resins prepared by many of the prior art processes. The amount of water employed for precipitation should be sufficiently great to prevent swelling or solubilization of the product in the precipitation process. As a modification of my process, the organic solvent is mixed with the precipitating water in a proportion which is not so great as to cause the acetal resin to mat together and yet in a sufficient proportion to assure openness of the precipitated product so that, upon subsequent washing, water can readily enter the interstices of the product. The following examples illustrate the carrying out of a process embodying my invention:

Example I

A formal resin was prepared by reacting 3.25 lbs. of paraformaldehyde for eight hours at 70° C. with 9.75 lbs. of polyvinyl acetate having a viscosity of 15 seconds. The reaction mixture also contained 7.75 lbs. of ethyl acetate, 10.25 lbs. of 95% ethyl alcohol, 230 cc. of 95% sulfuric acid and 328 cc. of water. After the reaction was completed, the reaction mixture was cooled rapidly to 30° C. and a mixture of 3000 cc. of 28% aqueous ammonia and 3000 cc. of acetone was mixed in to neutralize the catalyst. The mass was then further diluted with an equal volume of 95% ethyl alcohol and the product was precipitated by pouring this diluted mixture into agitated water at room temperature. The product, which was obtained was well disintegrated so that water could readily penetrate therein and a number of changes of water removed all the contaminating materials which might be present. After washing, the resin was dried at room temperature and was found to be in a loose condition and readily susceptible to solution by solvents therefore.

Example II

A formacetal resin was prepared by reacting 2.4 lbs. of paraldehyde with 11.4 lbs. of polyvinyl acetate, having a viscosity of 45 seconds, in a reaction mixture containing, in addition, 15 lbs. of ethyl acetate, 9.8 lbs. of 95% ethyl alcohol, 264 cc. of 95% sulfuric acid and 204 cc. of water. The mixture was tumbled at an average temperature of 70° C. for 6½ hours. 0.8 lb. of paraformaldehyde was added with stirring and the mixture was tumbled for seven hours longer at an average temperature of 70° C. The reaction mixture was then diluted with two volumes of 95% ethyl alcohol following which the product was poured into violently agitated water at room temperature. The product was obtained in a white fibrous form. The resin was readily susceptible to washing with water and, after a number of changes of water, was dried in an oven at 140°–160° F.

Example III 75 parts of polyvinyl alcohol was reacted with 150 parts of paraldehyde in a reaction mixture containing also 525 parts of 95% ethyl alcohol and 20 parts of 35% hydrochloric acid. The mass was maintained at 40° C. for 48 hours with stirring. The reaction mixture was then diluted with 1½ volumes of 95% ethyl alcohol. The resin was precipitated by pouring the mass into an excess of water, it separating out in a loosely separated form. It was then washed with water and dried. A resin, having a polyvinyl acetate content of 1% and polyvinyl alcohol content of 7.9%, was obtained.

In our process the precipitating liquid may contain even more lower fatty acid such as acetic acid than the range specified without causing agglomeration of the particles of precipitated resin as larger percentages of this type of solvent will be tolerated. The proportion of acetic acid used can be an additional 5% as a rule without derogating from the results. For instance the proportion of acetic acid in the water employed to precipitate may be as high as 25% without causing agglomeration of the particles of resin.

I claim:

A method of separating a polyvinyl acetal resin containing less than 20% polyvinyl acetate and insufficient polyvinyl alcohol to cause solubility in water, from its reaction mixture which comprises pouring the reaction mixture into a precipitating amount of agitated water containing approximately 10–25% of acetic acid.

CHARLES R. FORDYCE.